United States Patent Office 3,142,462
Patented July 28, 1964

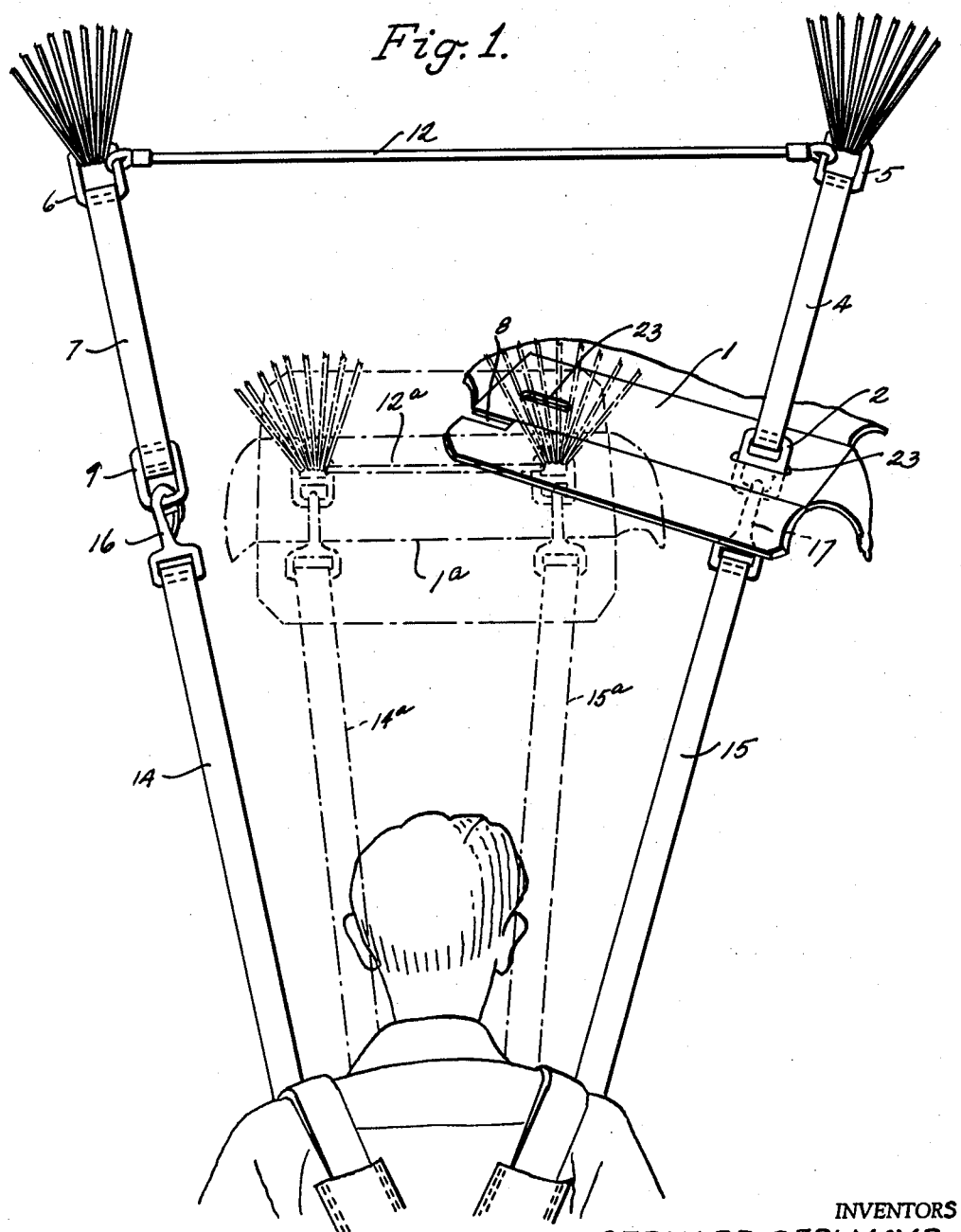

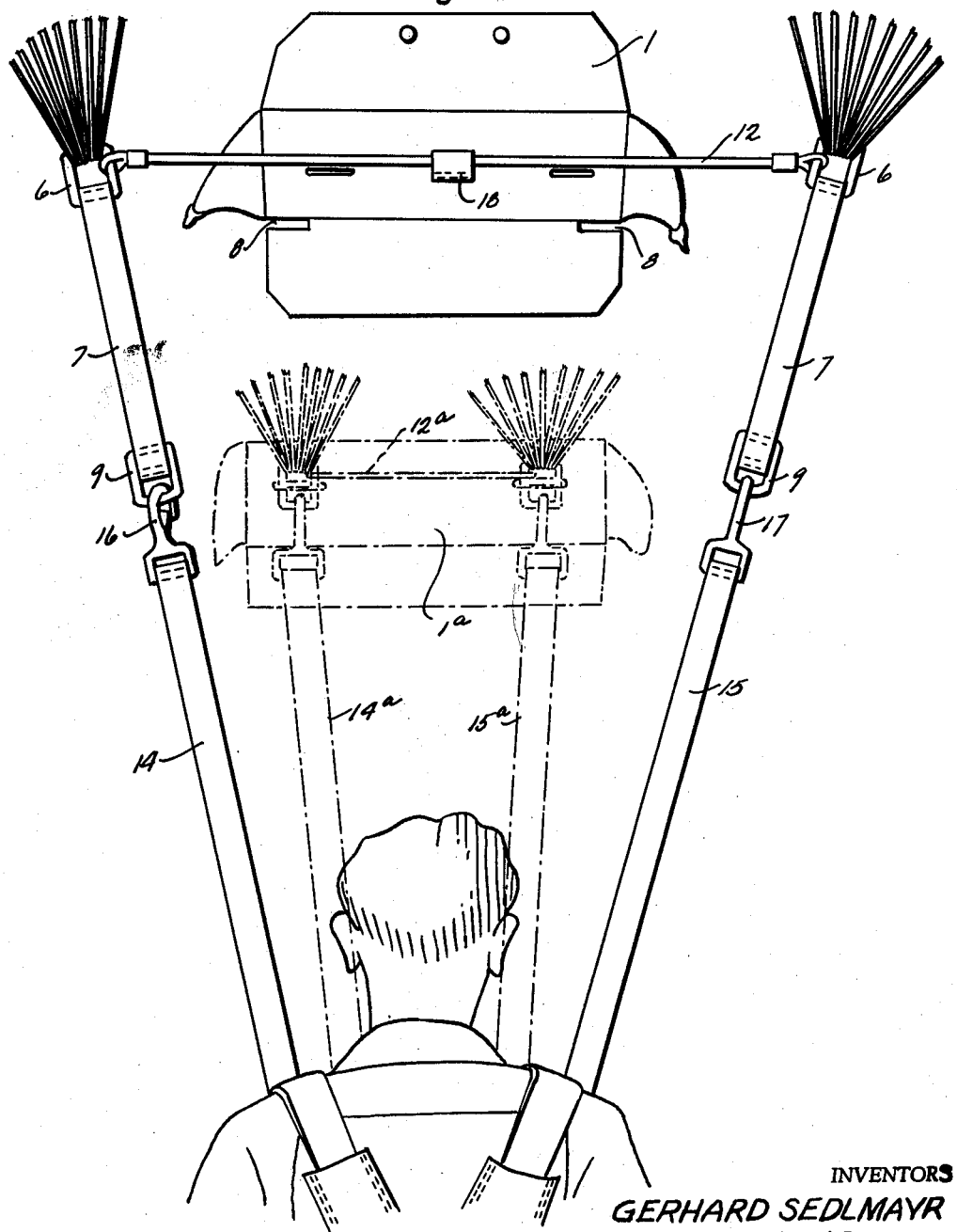

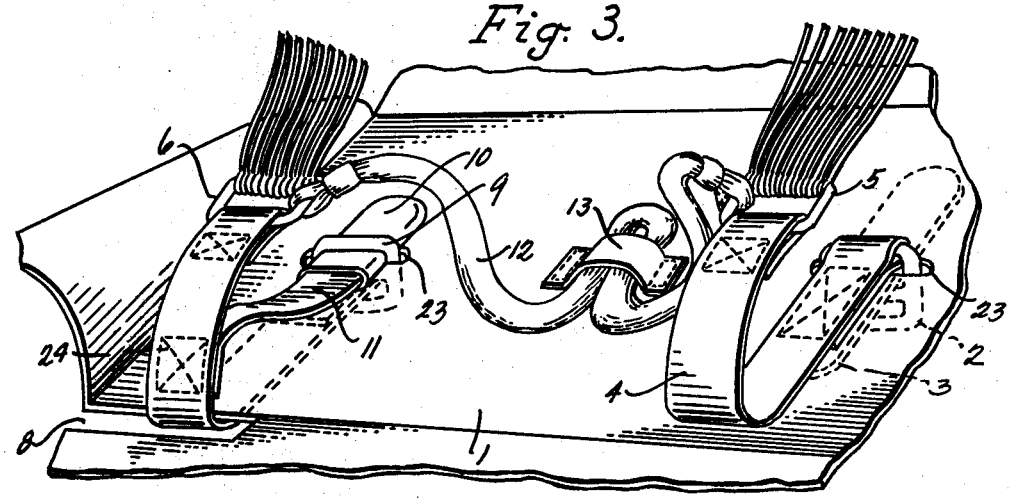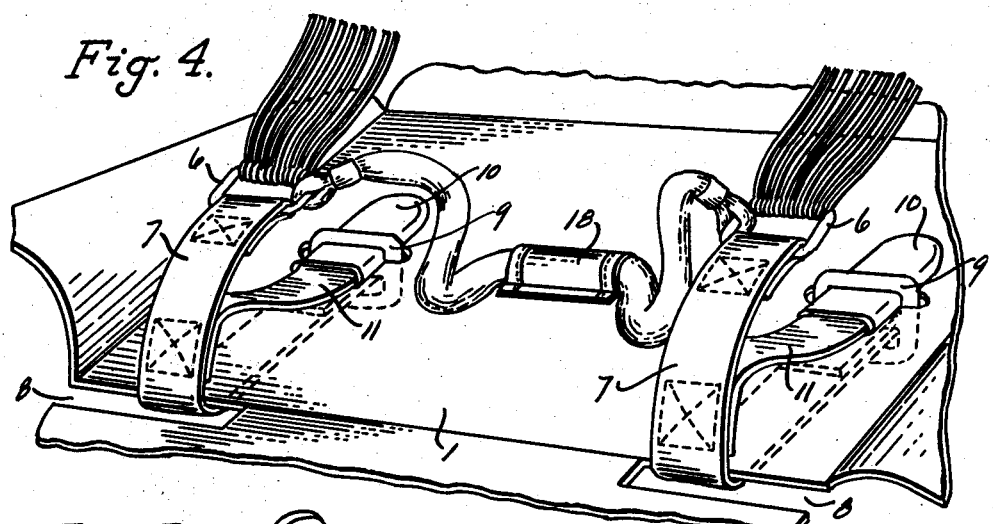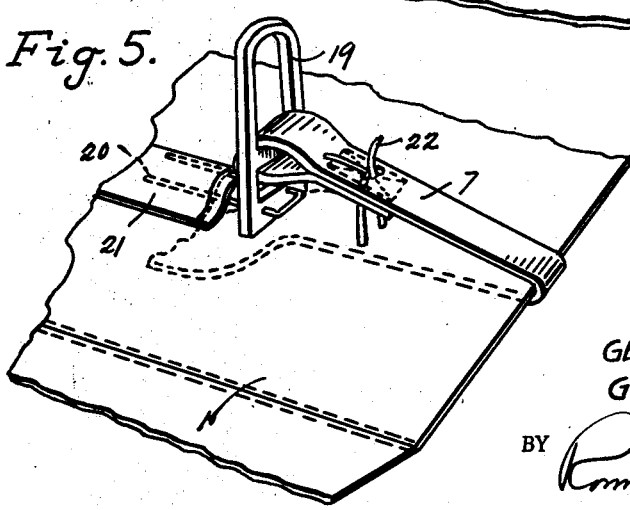

3,142,462
QUICK CONNECTOR PARACHUTE
Gerhard Franz Josef Andreas Sedlmayr, Lasbeker Strasse 2, Hamburg-Rahlstedt, Germany, and Gustav Bahr, Woldsenweg 3, Hamburg 20, Germany
Filed Mar. 26, 1963, Ser. No. 268,071
10 Claims. (Cl. 244—148)

This invention concerns improvements in parachutes and more particularly relates to quick-connector detachable parachutes and packs of the kind wherein the pack is provided with two externally accessible quick connector elements fixed upon the pack at a predetermined spacing corresponding to that of two complementary quick connector elements on the parachute harness and which complementary quick connector elements are connected with the lift webs of the harness.

In known parachutes of the above mentioned kind, the shroud lines in the interior of the pack are connected to the quick connector elements of the pack in the form of rings which extend through the pack bottom. Such are shown in U.S. Patents 1,958,000 and 2,016,236. The rings are intended to engage complementary snap or safety hooks secured to the main lift webs of the harness and are seated in holders, from which they are pulled by the opening of the parachute, such as shown in U.S. Patent 2,016,236. The holders can consist e.g. of break threads or of other means such as shown in U.S. Patent 1,958,000.

The operation of such packs and harnesses is well known. The spacing of the connector rings is fixed on the pack. Thus upon opening of the pack a parallelogram is formed of the shoulders of the parachutist, the two free ends of the main lift webs and the pack as a bridge. Inside this parallelogram is the head of the parachutist which theoretically just passes through.

When the parachute is deployed the transverse dimension of this parallelogram is narrowed because the opening parachute draws the webs together, and if the free ends of the main harness lift webs swing past the sides of the parachutist's head upon development of the parachute, injuries may result from abrasion or impact, as well as bruises by squeezing. The danger of injuries is even aggravated in the case of an initial oblique contact from the main lift webs, as a result of which the parachutist can either receive a blow in the face or be subjected to a strong lateral pressure on the cervical vertebra.

The present invention is based on the problem of providing a quick connector parachute in which the disadvantages or dangers of the known parachutes of this kind are excluded. According to the invention, the solution is effected in that means are provided for breaking the cross-connection between the two harness suspension members of the parachutist, which is made by the pack, said means being operated automatically as a result of the parachute being deployed. Thus the free ends of the main lift webs can spread obliquely outwardly from the shoulders of the parachutist under the strong, laterally directed component of tension exerted by the canopy connected shroud lines, indeed even before the upward movement of the main lift webs. Such a large distance is thus formed between the suspension members and the man's head that friction and impact effects are practically impossible.

According to a preferred feature of the invention, said means is operable to release one or both said externally accessible connector elements from the pack.

According to one embodiment of the invention, and in a connectible parachute pack in which connector rings extend through slits in the bottom of the pack and serve for the connection of the shroud lines, as well as for connection to the harness, it is arranged that the shroud lines, with the interposition of intermediate lift webs, are connected to the connector rings on the outside of the pack bottom, the intermediate webs extending from the outside of the pack bottom to the interior through open ended slots in the pack and that the ends of the connector rings protruding into the interior of the pack, are held by locking members which are connected to the intermediate lift webs and, upon opening of the parachute, can be pulled out by them. In this manner, the connector rings are pulled out of the pack bottom on both sides by the intermediate webs so that the spacing necessitated by the slits in the pack bottom is nullified and the suspension members are released laterally.

In another embodiment of the invention, the connection of the intermediate webs to the connector rings is only provided at one side of the pack on the outside of the pack bottom, whilst, on the other side, the intermediate web is connected within the pack, to the inwardly protruding end of the ring. In this embodiment, the pack remains suspended by one side thereof from the suspension member concerned so that it cannot be lost. Loss can also be avoided even if it is detached on both sides in that, according to the invention, it may be arranged that in the center of the bottom of the pack, there is provided a loop through which a connecting chord known per se for protection against failure to engage both connectors extends between the two suspension members.

In a still further embodiment of the invention, an intermediate web which is detachable from the pack or two intermediate webs which are detachable from the pack, coming from the connection point to the shroud lines from the interior of the pack, engage on the outside of the pack with a connector ring or rings which are held there in detachable upright position. In this case, the connector rings do not extend through the bottom of the pack.

In the drawings, wherein for the purpose of illustration, are shown different embodiments of the invention:

FIGURE 1 is a view showing a parachutist suspended on the lift webs of his harness with the pack container detached at one side from the respective lift web.

FIGURE 2 is a modified form of invention similar to FIG. 1 but with the pack container detached from the lift webs at both sides.

FIGURE 3 is a perspective view of the inner side of the container bottom with the pack of FIG. 1 opened after the canopy and the shroud lines have already left the pack but with the pack still firmly connected to the lift webs and showing a detachable connection of the pack container at one side thereof with the respective lift web.

FIGURE 4 is a perspective view of the modified structure of FIG. 2 with detachable connections at both sides of the pack container.

FIGURE 5 is a perspective view of a corner of a still modified form of invention showing the outside of a pack container bottom with an upright connector ring located only on the outer side of the pack container bottom.

FIGS. 1 and 3 show a chest type parachute with a detachable connection between pack and the lift webs at one side, i.e., with one lift web. The pack includes a container having a bottom wall which is rigid or held substantially rigid. It has the usual flaps for closing the pack container. In both figures, these flaps are shown in the opened condition. On the longitudinal center line of the bottom wall 1, there are provided right and left slits 23 through which the double D-shaped connector rings 2 and 9 extend, which project both inwardly and outwardly of the pack bottom wall 1. The outwardly (in the drawing downwardly) projecting ring portions serve to connect the pack to the snap hooks on the harness main lift webs on the chest of the parachutist. The buckle 2 in FIG. 3 is fixedly connected to the pack bottom 1, i.e., by a locking bar 3 which is on the outside of the bottom 1 and is located in packets such as shown in U.S. Patent 1,958,000. On the inwardly projecting portion of the ring 2, there is fixed an intermediate lifting web 4 which, at the other end, has a connector ring 5 to which the shroud lines at this side are connected. At the other side of the pack container bottom 1, the connector ring 9 is not fixedly connected to the pack like the ring 2 by means of a bar 3, but is detachably mounted. For this purpose, the intermediate lifting web 7 of the left group of shroud lines beneath the bottom 1 engages on the center bar of the conventional double ring 9 and extends from there through a laterally opened slot 8 in the front pack flap into the interior of the pack where the intermediate web 7 terminates in a connector ring 6 to which the other bunched shroud lines of the canopy are connected. Through the inwardly projecting portion of the ring 9 there passes a locking member 10 which may be of plastic, leather or metal; the continuation of which is an auxiliary flexible web 11 which is fixedly sewed at 24 to the intermediate web 7. A flexible safety web coupling cord or member 12 extends from the connector ring 5 to the connector ring 6 and because it is longer than the conventional safety coupling of present packs, the same is doubled upon itself and held in a container attached loop 13 during storage in the pack.

When the parachutist has actuated the manual release after the jump, the flaps of the pack open and the parachute canopy with the shroud lines leave the interior of the pack. FIG. 3 shows the point at which the shroud lines have left the pack completely and are just at the stage of pulling out the intermediate webs 4 and 7. The upper parts of the intermediate webs visible in FIG. 3, are pulled upwardly and pivoted forwardly out of the plane of the drawing at the same time. Because of this pivotal movement, the intermediate web 7 exerts a pull on the auxiliary web 11 and thus on the ring locking member 10. Thus the retaining member 10 is pulled out of the ring 9. Since the bottom 1 is then no longer fixedly connected to ring 9 at the point where this ring is located the shroud lines after extending the intermediate webs 4 and 7, exert a direct pull on the rings 2 and 9 and thus on the snap hooks 16, 17 (FIG. 1) which are pulled out of their holders (not shown), e.g. shaped spring holders such as shown in U.S. Patent 2,016,236. Thus, also the free ends 14, and 15 of the main lift webs (FIG. 1) can pivot upwardly. During this phase of release, the outwardly directed pull of the respective groups of shroud lines of the deploying canopy becomes apparent from the spreading of the webs 4, 7 and 14 and 15. This spreading pulls the intermediate web 7 according to FIG. 3 out of the slot 8, as a result of which this side of the pack is separated from the lift webs 7 and 14. This separation already takes place in front of the chest of the parachutist while the shroud lines and webs assume their final position. This final position is shown in FIG. 1 in which one can see that the head of the parachutist is sufficiently far removed from the webs 14 and 15 to prevent injury.

FIG. 1 shows in dot and dash lines the conditions with presently known connectible chest type parachutes. The container bottom 1ª holds the free ends 14ª and 15ª of the main lift webs firmly together in substantial parallelism with a spacing which is not wider than the parachutist's head. This spacing becomes even narrower due to load pull on the webs.

The safety cord or member 12 has the function of becoming effective in the event of the incidental breakdown of either of the two snap connections 2, 17 or 9, 16. It can indeed occur that due to hurry the harness connection is not correctly effected on one side. Then, without the cord 12, the parachute canopy would open up upwardly and cause the man to crash.

The form shown in FIGS. 2 and 4 corresponds essentially to the embodiment according to FIGS. 1 and 3 with the difference that the pack bottom 1 of FIGS. 2 and 4 is separated at both sides from the lift webs 7, 14 and 7, 15 (FIG. 2). To prevent loss of the pack, it remains suspended on the safety cord 12 by means of a loop 18. The function of the intermediate webs 7 with the auxiliary webs 11 and the locking members 10 in co-operation with the slots 8 is the same in the embodiment according to FIGS. 2 and 4 as that of the members at the left side of the embodiment of FIG. 3. For this reason, these members have the same reference numerals. The intermediate web 4 in the embodiment according to FIG. 3 is necessary as a balancing element on the right side of the parachute for the intermediate web 7 on the left side of the parachute so that the parachutist is carried in an upright position by the parachute.

A further embodiment is shown in FIG. 5. Here, no slits are provided in the bottom of the pack through which the connector rings pass, but connector rings 19 are only fitted on the outside of the pack container bottom 1. The connector rings 19 are elongated D-rings with an additional center bar which serves for the connection of the intermediate web 7. This intermediate web 7 thus extends from the outside of the pack bottom 1 around the edge thereof and through the open sided slot of the closing flap towards the interior of the pack where it terminates in a ring corresponding to the ring 6 in FIG. 3 and is thus connected to the appropriate group of shroud lines. Since it is necessary for the safe engagement of the pack on the snap hooks of the harness that the connector rings project rigidly in outward extension from the pack, the ring 19 is provided with a support comprising a fork 20 passing through suitable apertures in the lower part of the ring, which support insures the upright position of the ring 19. The ends of the fork 20 are inserted into a container pocket 21. To prevent the ring 19 with the fork 20 from unintentionally slipping out of the pocket 21 in the right-hand direction in FIG. 5, the two runs of the intermediate web 7 extending around the front edge of the bottom 1 are connected to each other by a simple stitched seam 22. This stitched seam forms a break point which can be caused to break without any difficulty upon release of the parachute by the application of the load on the opening parachute. Nothing then prevents the ring 19 with the fork 20 from being pulled out of the pocket 21, and the web 7 is separated from the bottom 1 so that the container bottom can no longer act as a cross-connection between the lift webs.

If desired, the fork 20 and the ring 19 can be made of one piece so that the ring 19 has an L-shaped profile.

The locking members 10 seen in FIGS. 3 and 4, temporarily fixing the connector rings 9 can also be pulled out of the rings 9 manually through a connection with the rip cord. Not only the pack is opened thereby, but also a separation of the pack bottom from the suspension elements is effected.

While in this application it has been stated that the connector rings are on the pack and snap hooks on the harness, the parts could just as well be reversed. Such condition is shown in U.S. Patent 2,157,504 and it is intended that the claims be interpreted in such light.

Various changes in the size, shape and arrangement of parts may be made to the form of invention herein shown and described without departing from the spirit of the invention and scope of the claims.

We claim:
1. Parachute apparatus comprising a harness having riser lift webs of the type adapted upon deployment of a parachute and its shroud lines to extend upwardly above the head of a wearer, connectors on the free ends of the lift webs, a parachute pack container including a bottom wall, connectors mounted on the bottom wall of the container having detachable connection with the harness lift webs, and means to disconnect a lift web of the harness and its connector from the pack container bottom wall by the force incidental to initial deployment of the parachute and lift webs of the harness.

2. The parachute apparatus of claim 1 in which the lift webs at the outer ends thereof above the normal position of the head of the wearer at the time of deployment of the parachute have a flexible cross safety connection between the lift webs appreciably longer than the spacing of the connectors on the pack bottom wall when in position upon said pack bottom wall whereby to permit the riser webs to diverge upwardly upon deployment of the parachute during load support.

3. In combination with a parachute harness having riser type lift webs to the ends of which are adapted to be connected canopy shroud lines, the lift webs being of the type which normally upon deployment of the parachute canopy will extend upwardly in divergent relation from a wearer, a parachute pack container having a bottom wall, a pair of connectors detachably connected in spaced relation upon said bottom wall in outstanding relation therefrom for connection to the parachute harness, said connectors each comprising a coupling portion for attachment to said lift webs, and means to disconnect said connectors from the bottom wall of the container under the force of deployment of the lift webs whereby to permit the lift webs at the sides of the head of a wearer under load support to diverge upwardly.

4. The combination of claim 3 in which a flexible safety connector member is attached to said lift webs outwardly beyond the connectors attached to said lift webs which is of a length appreciably greater than the spacing of said connectors when located on the bottom wall of the pack container whereby to permit the lift webs to diverge from their points of connection with the harness upwardly at and above the sides of the head of the wearer.

5. In combination with a parachute harness having riser type lift webs connected thereto and provided with coupling parts at the outer ends thereof, a parachute pack including a container having a bottom wall, lift web extensions having coupling parts for detachably connecting with the coupling parts of the outer ends of the lift webs, means connecting said coupling parts of the riser web extensions upon the bottom wall of the container with at least one of them having means for disconnecting the same from the bottom wall upon deployment of the parachute apparatus, and a flexible safety member connected to the outer ends of the lift web extension which is of a length appreciably greater than the length of the space between the coupling parts of said riser web extensions when attached on the container bottom wall whereby upon deployment the web extensions and riser webs in load supporting position will extend upwardly divergently to avoid contact with the head of the wearer at the time of deployment and during load support of the wearer.

6. In parachute apparatus the combination of a parachute pack container having a bottom wall, a parachute harness coupling ring connected on the bottom wall having a ring portion at the inner side of the wall and a ring portion at the outer side of the wall which is outstanding, a lift web having canopy shroud lines connected thereto, said container having a laterally opened slit therein adapted to receive said lift web so that an outer end portion thereof lies externally of the bottom wall and is connected to the connector ring externally of the pack, said lift web extending through the slit of the pack container and having a portion lying within the pack container, and means connected with the inner portion of said lift web detachably holding the coupling ring upon the bottom wall from which it is detached upon deployment of the parachute whereby to free the pack container from said lift web by movement of the latter through said slit.

7. A parachute apparatus as described in claim 6 in which two of said coupling rings are provided upon the bottom wall of the pack each having a riser web respectively connected thereto, and a flexible load transmitting member connected to the shroud line connected ends of said riser webs and normally lying within the pack when closed.

8. In a parachute apparatus of the class disclosed, the combination of a pack container including a bottom wall, a harness riser web including a portion normally lying externally of the pack container, said container having an opening therein so that a portion of said riser web extends within the container at the inner side of the bottom wall, said opening being such that the riser web is capable of free detachment from the container upon deployment of the parachute apparatus, a coupling ring, and means on the bottom wall of the pack container and the coupling ring to detachably connect the coupling ring in outstanding relation from the outer side of said container bottom wall from which it may be detached upon deployment of the parachute apparatus.

9. In parachute apparatus of the class described, the combination of a pack including a parachute and a container having a bottom wall, a parachute harness having riser type lift webs connected thereto, connector rings connected to said bottom wall having ring portions at the inner side of the bottom wall and ring portions at the outer side of the wall in outstanding relation therefrom, said riser webs each comprising a harness connected lift web portion and an outer lift web portion, connectors for each of the riser webs detachably connecting its respective harness lift web portion and outer lift web portion, said outer lift webs at the outer ends thereof having rings for connection to parachute shroud lines, a flexible safety coupling member connected to the rings last mentioned which is appreciably greater in length than the spacing of said ring portions upon the bottom wall of the container when they are attached thereto, and means connected to an outer lift web to automatically release its container connector ring from the pack container bottom wall under force incident to deployment of the parachute.

10. In parachute apparatus of the class described, the combination of a body encasing harness having flexible riser web portions adapted under conditions of support to normally diverge upwardly at the sides of and above the head of a wearer, said riser webs at their outer ends having couplings, outer lift webs having at their lower ends members for detachable connection with the couplings at the outer ends of the riser webs, said outer lift webs at their outer ends having means for connection with the shroud lines of a parachute canopy, a flexible member connecting together the outer ends of said outer lift webs which is of a length to permit the normal upward divergence of the riser webs and lift webs under load supporting conditions, a pack including a container having a bottom wall provided with connectors thereon for detachable connection with the couplings of the riser webs, and means attached to the outer portions of said outer lift webs to disconnect at least one of the bottom wall connectors from the pack container as an incident of force applied thereto during initial deployment of the parachute.

References Cited in the file of this patent
UNITED STATES PATENTS

| 3,088,700 | Carrey | May 7, 1963 |
| 3,117,753 | Ewing | Jan. 14, 1964 |

FOREIGN PATENTS

| 854,601 | Great Britain | Nov. 23, 1960 |